US009593709B2

(12) United States Patent
Joly

(10) Patent No.: US 9,593,709 B2
(45) Date of Patent: Mar. 14, 2017

(54) ANCHORING DEVICE FOR A TRANSMISSION CABLE

(75) Inventors: Pascal Michel Joly, Passy (FR); Marie-Pierre Joly, legal representative, Passy (FR)

(73) Assignee: KONGSBERG DRIVELINE SYSTEMS SAS (FR)

( * ) Notice: Subject to any disclaimer, the term of this patent is extended or adjusted under 35 U.S.C. 154(b) by 1201 days.

(21) Appl. No.: 13/254,554

(22) PCT Filed: Mar. 4, 2009
(Under 37 CFR 1.47)

(86) PCT No.: PCT/EP2009/001539
§ 371 (c)(1),
(2), (4) Date: Oct. 11, 2012

(87) PCT Pub. No.: WO2010/099803
PCT Pub. Date: Sep. 10, 2010

(65) Prior Publication Data
US 2013/0087007 A1 Apr. 11, 2013

(51) Int. Cl.
*F16C 1/10* (2006.01)
*F16C 1/26* (2006.01)

(52) U.S. Cl.
CPC .............. *F16C 1/102* (2013.01); *F16C 1/262* (2013.01); *Y10T 74/2045* (2015.01)

(58) Field of Classification Search
CPC .......... F16C 1/102; F16C 1/103; F16C 1/105; F16C 1/20; F16C 1/14; F16C 1/101; F16C 1/262; F16C 1/26; F16C 1/145; Y10T 74/20456; Y10T 74/2045; Y10T 74/20462; Y10T 74/20402

USPC ........ 74/502.4–502.6, 500.5; 248/49, 65, 71, 248/73; 403/194–197, 199, DIG. 4, 326, 403/329; 24/136 R; 174/663, 654, 655, 174/660, 668, 68.1, 72 A
See application file for complete search history.

(56) References Cited

U.S. PATENT DOCUMENTS 3,139,768 A * 7/1964 Biesecker ............... F16C 1/103
285/205
3,631,738 A * 1/1972 Harper .......................... 74/502.4
4,494,719 A * 1/1985 Guidicelli .................... 248/27.1
(Continued)

FOREIGN PATENT DOCUMENTS

EP 1 026 411 A2 8/2000

*Primary Examiner* — Adam D Rogers
(74) *Attorney, Agent, or Firm* — Howard & Howard Attorneys PLLC

(57) ABSTRACT

An anchoring device for anchoring a sheath of a transmission cable to a bracket may include a sleeve coaxially connectable to the sheath of the cable, the sleeve having a plurality of tangs extending longitudinally and arranged in a circular configuration, the tangs each having a transversal surface defining a wall of a circumferential groove, the groove being able to receive a bracket and to secure the sheath of the cable from longitudinal movements relative to the bracket, the anchoring device may include a ring longitudinally movable relative to the sleeve between first and second longitudinal positions, and wherein the ring is able to force the tangs to move inward upon movement of the ring from the first to the second longitudinal position such that the diameter of the wall of the circumferential groove is decreased.

19 Claims, 7 Drawing Sheets

(56) References Cited

U.S. PATENT DOCUMENTS

| | | | |
|---|---|---|---|
| 4,621,166 A * | 11/1986 | Neuroth | H02G 3/0691 |
| | | | 174/660 |
| 4,753,458 A * | 6/1988 | Case | F16L 37/0987 |
| | | | 285/319 |
| 4,773,279 A | 9/1988 | Spease et al. | |
| 5,613,405 A | 3/1997 | Kelley et al. | |
| 6,114,630 A | 9/2000 | Gretz | |
| 6,189,407 B1 * | 2/2001 | Champ et al. | 74/502.4 |
| 7,476,817 B1 * | 1/2009 | Shemtov | H01R 13/5816 |
| | | | 174/661 |
| 7,494,157 B1 * | 2/2009 | Kiely | F16L 5/027 |
| | | | 285/139.1 |
| 7,952,034 B2 * | 5/2011 | Kiely | H02G 3/0683 |
| | | | 174/650 |
| 8,253,043 B1 * | 8/2012 | Kiely | H02G 3/0616 |
| | | | 174/650 |
| 2003/0198510 A1 * | 10/2003 | Dona-Contero | F16C 1/103 |
| | | | 403/316 |
| 2006/0110217 A1 * | 5/2006 | Foster et al. | 403/384 |
| 2014/0326836 A1 * | 11/2014 | Kim | F16C 1/105 |
| | | | 248/65 |

* cited by examiner

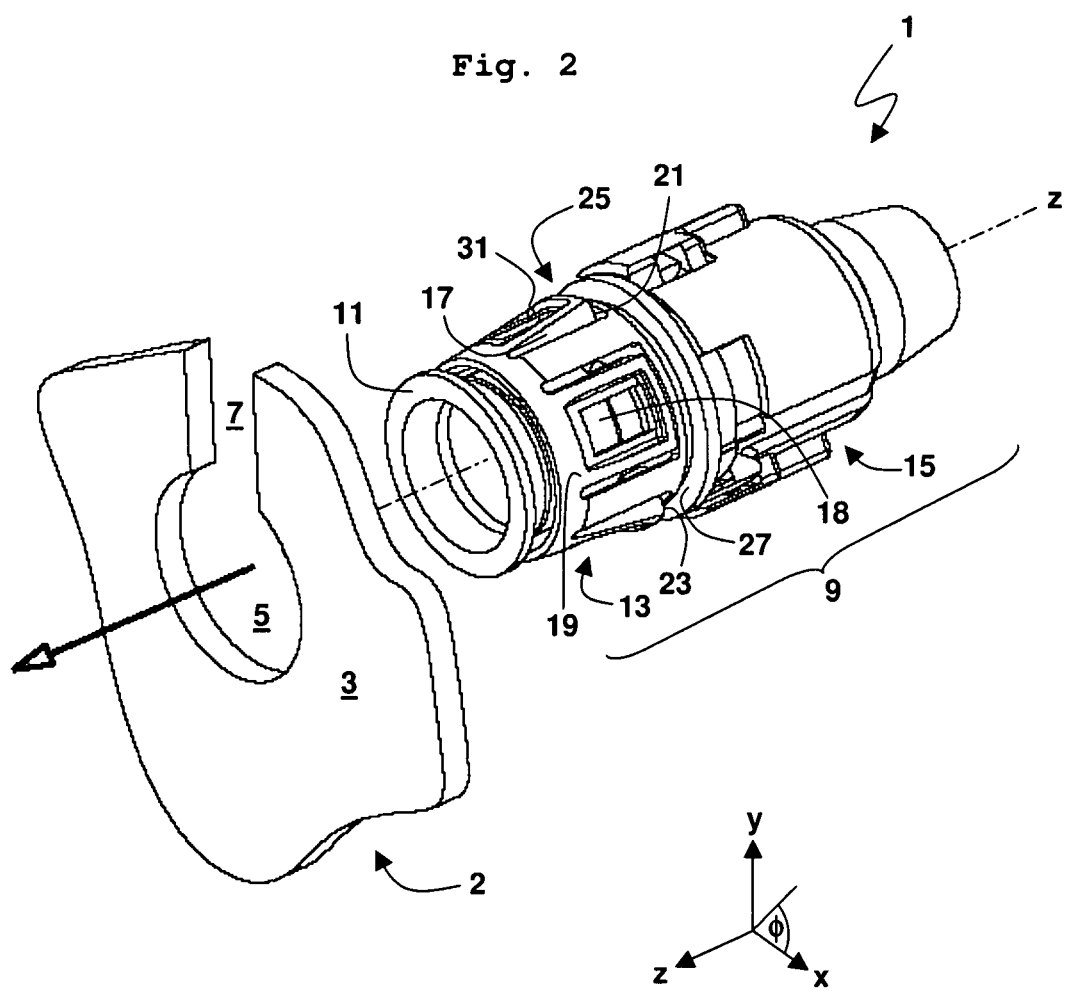

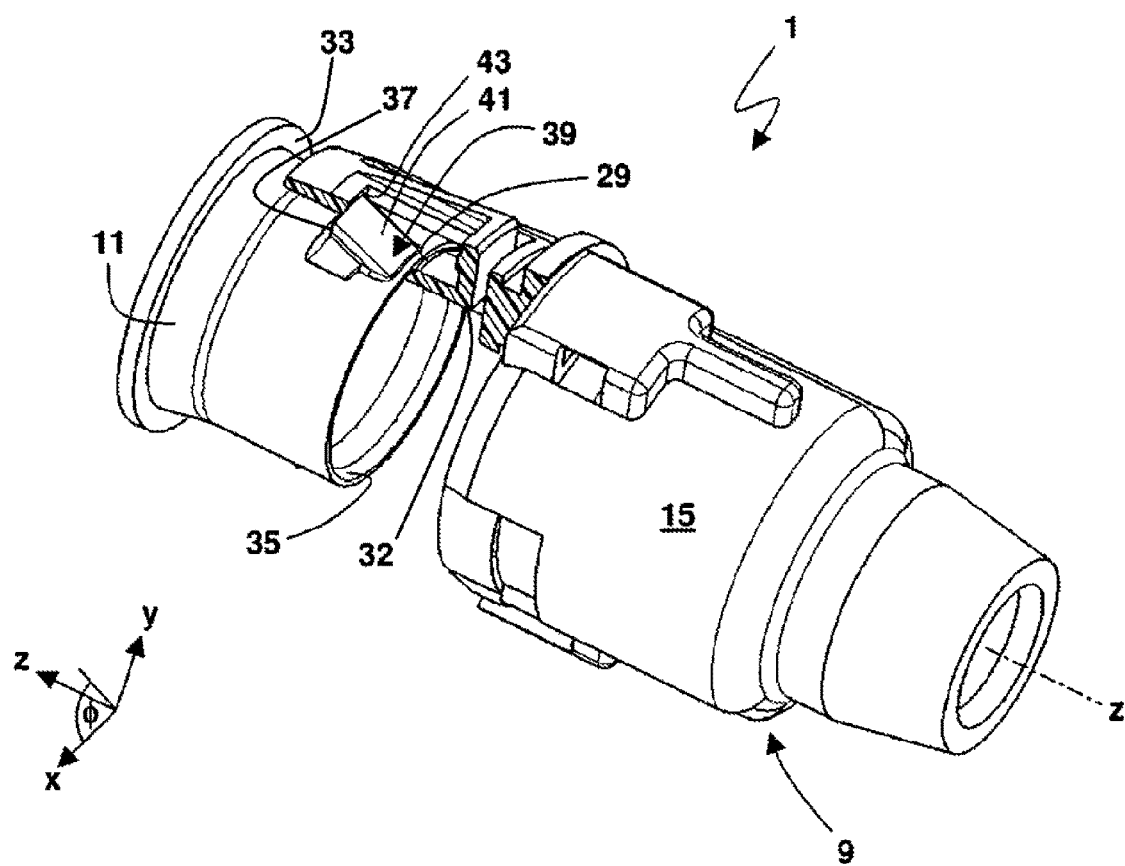

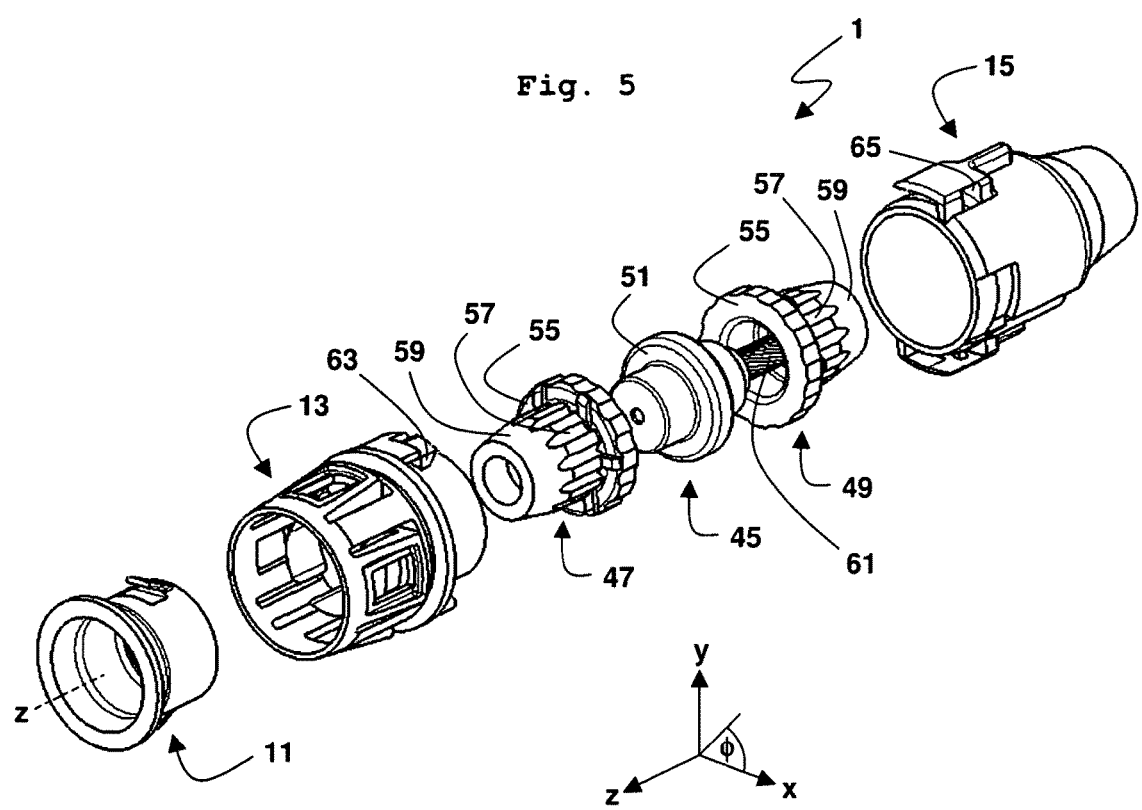

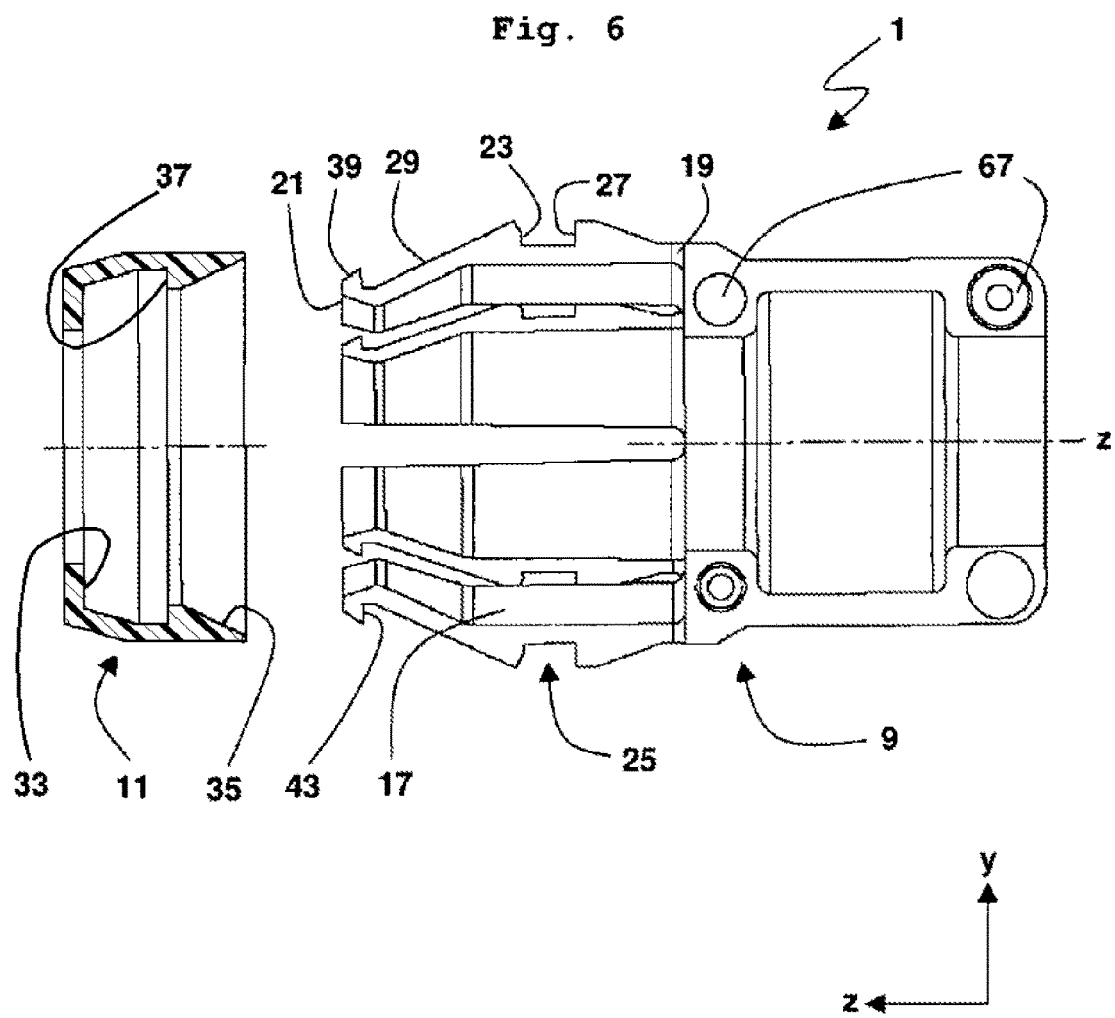

ANCHORING DEVICE FOR A TRANSMISSION CABLE

The subject patent application claims priority to and all the benefits of International Application No. PCT/EP2009/001539, which was filed on Mar. 4, 2009with the World Intellectual Property Organization, the disclosure of which is hereby incorporated by reference.

The present invention refers to an anchoring device for anchoring a sheath of a transmission cable to a bracket and a motion transmitting remote control assembly wherein such an anchoring device is used for anchoring a transmission cable to a bracket. Such an anchoring device comprises a sleeve element having a longitudinal axis, wherein the sleeve element is coaxially connectable to the sheath of the transmission cable. The sleeve element has a plurality of resilient tangs extending longitudinally and arranged in a circular configuration about the longitudinal axis. The tangs each have a transversal tang surface, wherein the transversal tang surfaces define a wall of a circumferential groove. The circumferential groove is able to receive a bracket and to secure a sheath of a transmission cable from longitudinal movements relative to a received bracket.

Motion transmitting remote control assemblies are typically used to transfer mechanical commands from one point to another, for example to transfer shift commands from the shift lever to the gear box, from the gas pedal to the throttle valve, or from the clutch pedal to the clutch plates in vehicles. The commands are typically transferred via a transmission cable, such as a Bowden-type cable, wherein the sheath of a Bowden cable is anchored to brackets fixed to the vehicle frame and an inner cable in form of a wire can be pulled or pushed along the conduit defined by the anchored sheath in order to transfer mechanical commands.

It is known to use an anchoring device for attaching the sheath of a Bowden cable. Such known anchoring devices usually comprise a casing in form of a sleeve which is coaxially attached to the sheath. The casing may comprise a peripheral groove such that the casing can be arranged in a U-shaped slot of a bracket fixed to the vehicle.

It is further known, for example from EP 1 026 411 A2, to use a securing member in form of a longitudinally movable ring mounted on the casing and spring-loaded towards the groove adapted to receive the bracket. During assembly, the securing member can be held back manually by the assembler, and as soon as the assembly of the anchoring device is completed the assembler may let the securing member snap into a securing contact with the bracket.

The anchoring device known from EP 1 026 411 A2 has several disadvantages. First of all, the anchoring device is only suitable for anchoring the transmission cable to an open U-shaped slot of a bracket, but not to a closed opening in the bracket such as a bore or any other closed aperture. Secondly, the handling of mounting and dismounting of the anchoring device is very awkward, because the securing member must be held back manually during mounting and dismounting. This can be very difficult at locations with limited space and which are difficult to reach by the assembler. The mounting procedure cannot be performed quickly and easily by an assembler or by a conventional assembling robot in the assembly line.

U.S. Pat. No. 4,773,279 describes an anchoring device with a support means including a pair of legs which are flexible radially inward as the support means is inserted in an aperture of a bulkhead. The legs define inclined surfaces adapted to be in sliding contact with the bulkhead during mounting of the anchoring device such that the legs are forced to bend radially inward during insertion of the support means into the aperture. As soon as the support means is inserted in an aperture of a bulkhead, the flexible legs snap radially outward to secure the support means from longitudinal movements relative to the bulkhead.

The solution described in U.S. Pat. No. 4,773,279 is problematic, because in case of an open U-shaped slot of a bulkhead it must be guaranteed that the rotational position of both legs is such that the bulkhead is engaged by both legs. If the rotational position is initially or due to later agitation such that only one of the legs secures the support means a risk of loosening and unintended release of the transmission cable is significantly increased. Such an anchoring device is therefore not suitable for a bulkhead with an open aperture such as a U-shaped slot. In case the device is provided with a rotational stop, appropriate rotational orientation is required prior to assembling.

The dismantling procedure shows a further disadvantage of an anchoring device as described in U.S. Pat. No. 4,773,279. Each leg comprises tabs to be manually pressed radially inward, e.g. with thumb and index finger, in order to be able to pull the anchoring device off the bulkhead. This is a complicated manual action. Furthermore, the manual access to the legs can be restricted due to surrounding material or the transmission cable itself. For example, the anchoring device may be rotated due to agitation into a rotational position in which one leg is located behind the transmission cable from an assembler's point of view. The dismantling procedure can be very awkward or even impossible in such a case where the space is restricted by surrounding material.

It is therefore the object of the present invention to provide an anchoring device which secures the sheath of a transmission cable from longitudinal movements relative to a bracket, which is safe against an unintended release and which can be quickly and easily mounted and dismounted to a bracket with an open or closed aperture.

This object is solved by an inventive anchoring device and a motion transmitting remote control assembly according to the features of Claims 1 and 11, respectively. Preferred embodiments of the invention are subject of the dependent claims.

According to a first aspect of the present invention an anchoring device for anchoring a sheath of a transmission cable to a bracket is provided. The inventive device comprises a sleeve element having a longitudinal axis, wherein the sleeve element is coaxially connectable to the sheath of the transmission cable. The sleeve element has a plurality of resilient tangs extending longitudinally and arranged in a circular configuration about the longitudinal axis and the tangs each have a transversal tang surface, wherein the transversal tang surfaces define a wall of a circumferential groove. The circumferential groove is able to receive a bracket and to secure a sheath of a transmission cable from longitudinal movements relative to a received bracket. The inventive anchoring device is characterised in that it further comprises a ring member being arranged coaxially and being longitudinally movable relative to the sleeve element between a first and a second longitudinal position, wherein the ring member is able to force the tangs to move concertedly radially inward upon a movement of the ring member from the first to the second longitudinal position such that the diameter of the wall of the circumferential groove is decreased.

The inventive solution using a movable ring member which is able to force a plurality of resilient tangs moving concertedly radially inward has several advantages over the devices known in the prior art. First of all, any number of tangs may be forced inward in a concerted way by a very easy and quickly performable longitudinal movement of the ring member. Preferably, the sleeve element comprises more than two, most preferably six or more tangs arranged in a circular configuration about the longitudinal axis. This has the advantage that the rotational position of the anchoring device relative to a received bracket is irrelevant. The anchoring device secures the transmission cable in any rotational position with the same safety and there is no rotational position in which a tang cannot be reached to release the anchoring device from the bracket, because all tangs move concertedly upon movement of the ring member from the first to the second longitudinal position.

The longitudinally extending resilient tangs may be formed as flexible tongues having a loose end which may be forced to move radially inward against the resilient force of the flexible material the tangs are made of. The other fixed end may be attached to the sleeve element. It is further preferred that the tangs comprise an inclined tang surface having a normal vector with a radially outward component and tapering into a first longitudinal direction, wherein the inclined tang surfaces are arranged to be in sliding contact with the ring member such that the ring member is able to force the tangs radially inward upon movement of the ring member from the first to the second longitudinal position.

This has the advantage that the sleeve element can be formed as an integrally moulded plastic housing including the plurality of tangs. A complicated mechanism including hinges or the like is therefore not needed.

In order to reduce friction, abrasion and wear, the ring member may comprise corresponding inclined ring member surfaces having a normal vector with a radially inward component and being in sliding contact with the inclined tang surfaces when the ring member is in the first longitudinal position.

To facilitate the mounting procedure of the anchoring device, the tangs may also comprise an inclined tang surface having a normal vector with a radially outward component and tapering into a longitudinal direction, wherein the inclined tang surfaces are adapted to be able to be in sliding contact with a bracket such that the bracket forces the tangs radially inward upon movement of the sleeve element into that longitudinal direction.

Thereby, the anchoring device simply needs to be pushed into an aperture of a bracket in a longitudinal movement in order to mount the anchoring device on a bracket. Once the bracket has reached the circumferential groove, the tangs which are forced inwardly during insertion by the bulkhead surrounding the aperture of the bracket snap radially outward back into their initial position locking the anchoring device to the bracket.

In a first embodiment of the inventive anchoring device those inclined tang surfaces which are arranged to be in sliding contact with the ring member are separate from those inclined tang surfaces which are adapted to be able to be in sliding contact with a bracket. In this first embodiment those inclined tang surfaces which are adapted to be able to be in sliding contact with a bracket may taper from the transversal tang surface defining a wall of the circumferential groove towards a fixed end of the tang. This has the advantage that the loose end of the tangs is framed by the main body of the sleeve element. The risk of breaking off tangs is thereby reduced. To provide a further separated inclined tang surface which are arranged to be in sliding contact with the ring member, the tangs may comprise at the loose end an inward collar which defines an inner inclined tang surface. In this first embodiment the ring member may have a portion with a smaller outer diameter than the inner diameter of the portion of the sleeve element comprising the tangs. The ring member may then be inserted into the sleeve element in order to establish a sliding contact with the inner inclined tang surfaces.

In an alternative second embodiment of the inventive anchoring device those inclined tang surfaces which are arranged to be in sliding contact with the ring member are also adapted to be able to be in sliding contact with a bracket. In this second embodiment the inclined tang surfaces may taper from the transversal tang surface defining a wall of the circumferential groove towards a loose end of the tang, and not towards the fixed end as it was described for the first embodiment. Both the ring member and/or the bulkhead surrounding the aperture of a bracket may be in sliding contact with the inclined tang surfaces. The contact with the bulkhead can be used to easily mount the anchoring device and the contact with the ring member can be used to release the anchoring device.

Compared to the first embodiment the second embodiment has the disadvantage that the transversal tang surfaces cannot be arranged at the loose end of the tangs where the tangs show the highest radial mobility. Therefore, the tangs of the second embodiment perform a larger inward angular deflection compared to the tangs of the first embodiment. As a result, the tangs of the second embodiment need to be designed more robust against breaking. However, the second embodiment has the advantage that the ring member acts as a protective element enclosing the free ends of the tangs.

It is advantageous for mounting the anchoring device to a sheath of a transmission cable if the sleeve element is essentially comprised of two longitudinal halves connected to each other. The anchoring device may further comprise inner elements such as attachment sleeves and an inner part for attaching the sheath or guiding the inner cable of a transmission cable, respectively. The inner elements may be embedded in a form-fit manner between the halves of the sleeve element once they are connected to each other.

It may be desirable to restrict the longitudinal movement of the ring member relative to the sleeve element. Otherwise the ring member would be separable from the sleeve element which yields an increased risk of losing the ring member. In order to achieve such a restriction the sleeve element may have at least one transversal stop surface which is adapted to restrict the longitudinal movement of the ring member relative to the sleeve element. Preferably, that at least one transversal stop surface is a surface of at least one tang. More preferably, the ring member has at least one transversal abut surface adapted to abut against that at least one transversal stop surface of the sleeve element.

It may be appreciated that in certain applications a separation of the ring member is useful or needed. For example, if the ring member has a larger outer diameter than an aperture in a bracket such that it may serve to further secure the anchoring device. In this case the separate ring member may not fit through the aperture and must be clipped on the sleeve element once the sleeve element protrudes through the aperture.

According to a further aspect of the present invention a motion transmitting remote control assembly is provided comprising a transmission cable having an inner cable arranged within a sheath, a bracket and an inventive anchoring device as it was described above, wherein the sheath of the transmission cable is anchored to the bracket via the anchoring device. Preferably, the bracket comprises a transversal bulkhead defining an aperture, wherein the tangs of the anchoring device at least partially protrude through the aperture and is anchored to the bulkhead defining the aperture.

It is further preferred that the circumferential groove of the anchoring device is engaged by the bulkhead defining the aperture and secures the sheath of the transmission cable from longitudinal movements relative to the bracket.

The aperture may be fully surrounded by the material of the bracket, e.g. O-shaped, or with one side open to a slot, e.g. U-shaped or Ω-shaped.

It is appreciated that all previously described advantageous variations of the inventive anchoring device for anchoring a transmission cable in a motion transmitting remote control assembly also apply for an anchoring device used to stabilise any movable elongate member in a predetermined position.

In the following, two preferred embodiments of the invention are discussed in further detail with reference to the accompanying figures.

FIGS. 1 and 2 depict a perspective view of a first preferred embodiment of an inventive anchoring device provided for anchoring a transmission cable to a bracket with a closed and open aperture, respectively.

FIG. 3 shows a more detailed perspective half-cut view of a first preferred embodiment of an inventive anchoring device.

FIG. 5 shows an exploded view of a first preferred embodiment of an inventive anchoring device.

FIG. 6 shows a longitudinal side view of one half of a second preferred embodiment of an inventive anchoring device.

Figure 1:
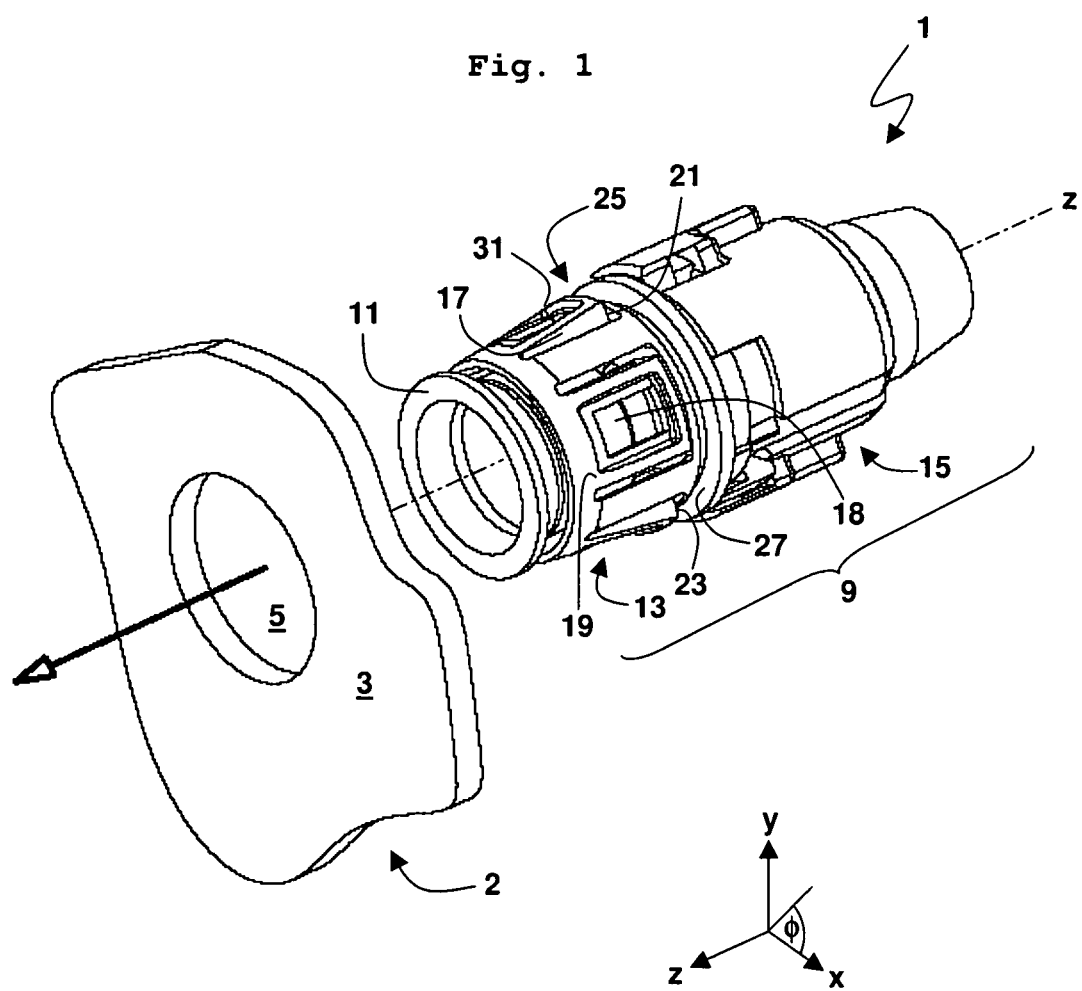

The anchoring device 1 shown in FIGS. 1 and 2 extends along a longitudinal axis z and is, essentially, rotationally symmetric about the longitudinal axis z. For the sake of clarity, the figures show an arbitrarily defined Cartesian coordinate system with a longitudinal axis z and a transversal plane spanned by the horizontal axis x and the vertical axis y. The positive z-direction may be defined as a first longitudinal direction (forward) and the negative z-direction as a second longitudinal direction (backward). The transversal plane extends radially, wherein the azimuthal position in the transversal plane is given by the azimuth angle ϕ to the horizontal axis x. It should be noted that this is an arbitrary convention for a better understanding that should not be misinterpreted as limiting the scope of the invention.

The anchoring device 1 is adapted to be attached to a Bowden-type cable (not shown) with an end portion that extends along the longitudinal axis z. The anchoring device 1 is supposed to anchor the Bowden-type cable to a bracket 2 of which a bulkhead 3 comprising an aperture 5 is partly shown. In FIG. 1 the aperture 5 is closed, i.e. the aperture 5 is radially completely surrounded by the bulkhead 3, like a bore. The aperture 5 shown in FIG. 2, however, is open to the upper side in form of a Ω-shaped slot 7. For mounting and dismounting the Bowden-type cable may be fed sideways through this Ω-shaped slot 7. This has the advantage that the cable does not need to be fed through the aperture 5 endwise.

The anchoring device 1 comprises a sleeve element 9 and a ring member 11. Further inner elements of the anchoring device 1 are better visible in the exploded view of FIG. 5.

The sleeve element 9 is made up of a forward sleeve section 13 and a backward sleeve section 15, wherein the forward sleeve section 13 and the backward sleeve section 15 are coaxially connected to each other. The forward sleeve section 13 comprises four resilient tangs 17 in form of lugs with a central radial opening 18, wherein the tangs 17 are arranged in a circular configuration about the longitudinal axis. Each of the tangs 17 extends backward from a fixed end 19 to a loose end 21 such that the loose end 21 is able to move radially inward against the resilient force of the plastic material the tangs 17 are composed of. At the loose end 21 a transversal tang surface 23 is provided at each tang 17. The transversal tang surfaces 23 of the four tangs 17 define a forward wall of a circumferential groove 25. An annular transversal flange surface 27 spaced apart from the transversal tang surfaces 23 by the width of the groove 25 defines the backward wall of the groove 25. The diameter of the sleeve element 9 at the circumferential groove 25 between the walls corresponds to the diameter of the aperture 5 of the bracket 2. Accordingly, the width of the groove 25 corresponds to the thickness of the bulkhead 3 of the bracket 2. Thereby, the groove 25 is able to receive the bulkhead 3 of a bracket 2 within the groove 25 in order to secure a sheath of a transmission cable from longitudinal movements relative to the received bracket 2.

Each tang 17 further comprises two separate inclined tang surface 29, 31 having a normal vector with a radially outward component and tapering into the forward direction. One of the inclined tang surfaces 29 (not visible in FIGS. 1 and 2) is a surface arranged at an inner collar 32 of the tangs 17 and arranged to be in sliding contact with the ring member 11. The other inclined tang surfaces 31 define a radially outer surface of the tangs 17 which is adapted to be able to be in sliding contact with a bracket 2 such that the bracket 2 is able to force the tangs 17 radially inward when the sleeve element 9 is pushed forward into the aperture 5 of the bracket 2.

The ring member 11 which is coaxially inserted into the forward inner opening of the forward sleeve section 13 has a smaller outer diameter than the aperture 5 of the bracket such that the ring member 11 protrudes through the aperture 5 when the sleeve element 9 is completely inserted into the aperture 5.

The ring member 11 is longitudinally movable relative to the sleeve element 9 between a first and a second longitudinal position relative to the sleeve element 9. In FIGS. 1 and 2 the ring member 11 is shown in the first position which can be referred to as the mounting position. On the way from the mounting position to the second longitudinal position, i.e. the dismounting position, the ring member 11 is able to force the tangs 17 to move concertedly radially inward. In the dismounting position (shown in FIG. 4b) the diameter of the forward wall of the circumferential groove 25 which is defined by the transversal tang surfaces 23 is decreased such that the sleeve element 9 can be pulled backward out of the aperture 5.

The connection between the ring member 11 and the sleeve element 9 is better visible in the half-cut perspective view of FIG. 3. The ring member 11 is formed as an inner tubular member with an outer flange 33 at its forward end. At the backward end that is inserted into the forward sleeve section 13 of the sleeve element 9 the ring member 11 has an inner chamfer which defines an inclined ring member surface 35 having a normal vector with a radially inward component. This inclined ring member surface is adapted to be in sliding contact with the inclined tang surfaces 29. These tang surfaces 29 are arranged at the forward face of an inner collar 32 of the tangs 17. They have a normal vector with a radially outward component and taper into a forward direction. Upon movement of the ring member 11 from the mounting position (shown in FIGS. 3 and 4a) to the dismounting position (shown in FIG. 4b) the inclined ring member surface 35 slides in contact with the correspondingly inclined tang surfaces 29 and forces the tangs 17 radially inward.

A further feature of the inclined ring member surface 35 being in sliding contact with the inclined tang surfaces 29 is that the ring member 11 is biased by the resilient force of the tangs 17 towards the mounting position. Thereby, the ring member 11 is always prepared to be manually pushed backward into the dismounting position and the play of the ring is eliminated.

It is further shown in FIG. 3 that the ring member 11 comprises a transversal abut surface 37 which is defined by the loose forward end of a flexible ring member tang 39. The ring member tang 39 has a fixed backward end and defines an outer inclined surface 41 which tapers into the backward direction. Thereby, the ring member tang 39 can bend inward when the ring member 11 is inserted into the sleeve element 9. As soon as the transversal abut surface 37 has reached the inner opening 18 of the lug-shaped tangs 17 of the sleeve element 9 the ring member tang 39 snaps radially outward preventing the forward release of the ring member 11 from the sleeve element 9. The fixed forward end of each tang 17 of the sleeve element 9 comprises a transversal stop surface 43 against which the transversal abut surface 37 of the ring member tang 39 abuts when the ring member 11 is pulled out. It is therefore adapted to restrict the longitudinal movement of the ring member 11 relative to the sleeve element 9. However, the ring member 11 is movable backward towards a dismounting position which is located further backward relative to the sleeve element 11.

Figure 4A:
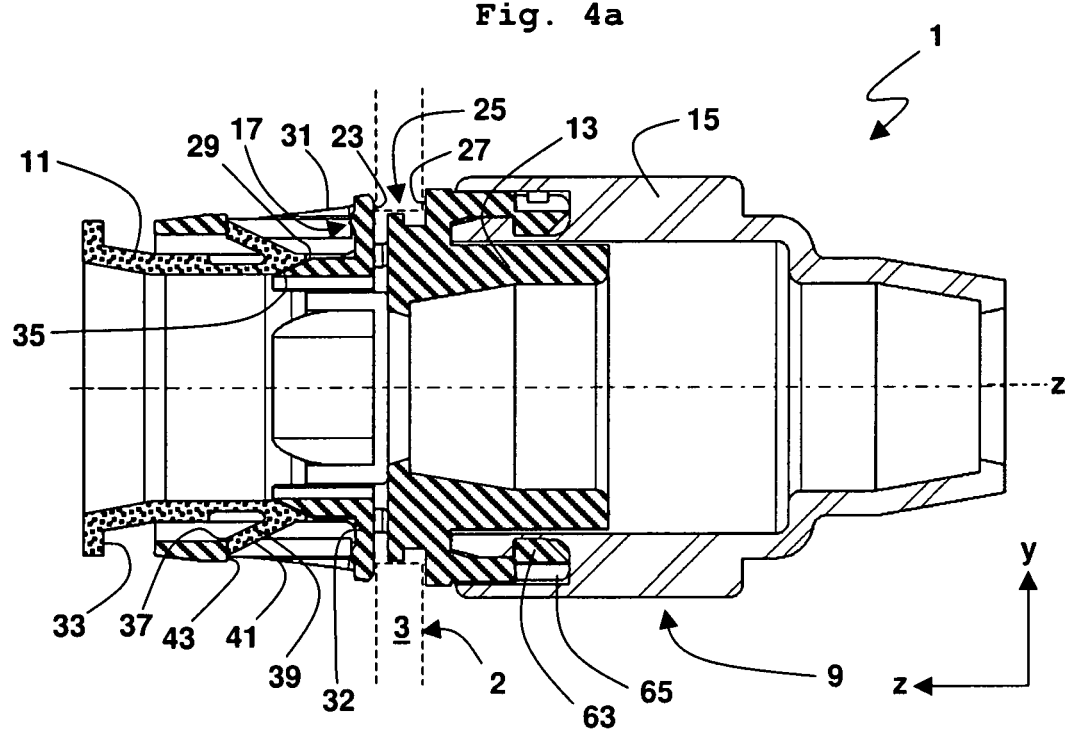
FIGS. 4a and 4b show longitudinal cut views of a first preferred embodiment of an inventive anchoring device, wherein the ring member is in a first and second longitudinal position, respectively.
Figure 4B:
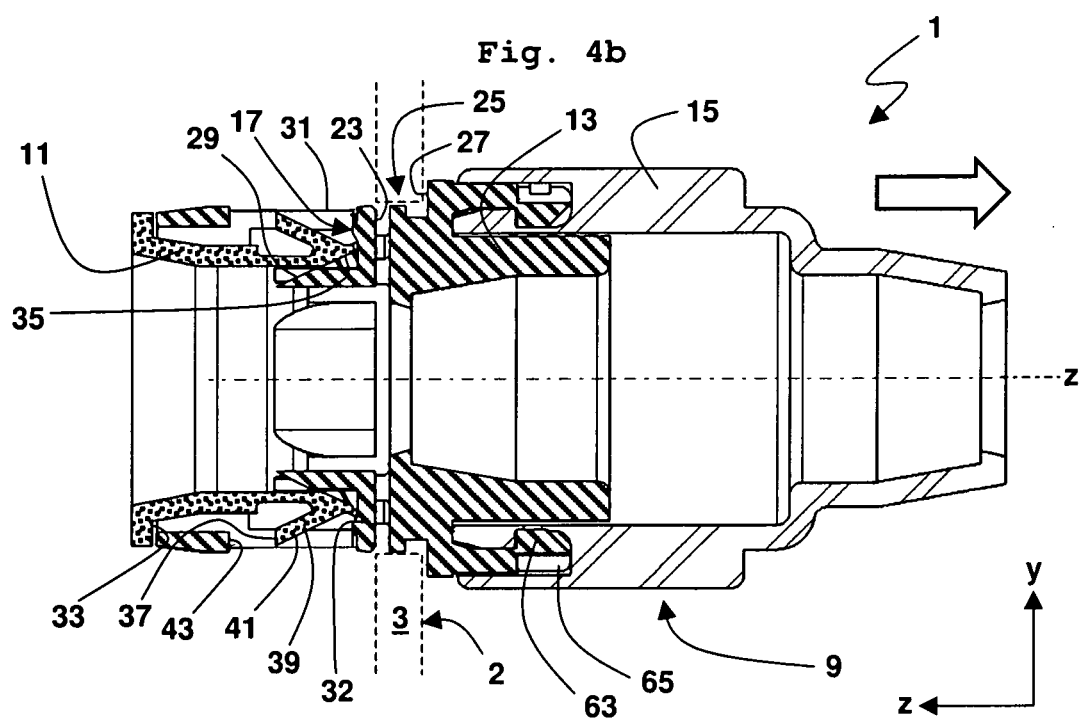

FIGS. 4a and 4b give an impression of the first and second longitudinal position, respectively, of the ring member 11 relative to the sleeve element 9. In the first longitudinal position, i.e. the mounting position, the anchoring device 1 can be anchored to a bracket 2, wherein the bulkhead 3 around the aperture 5 is received within the groove 25 having two walls of which the forward wall is defined by the transversal tang surface 23 of the sleeve element 9. The annular transversal flange surface 27 defines the backward wall of the groove 25. The backward wall restricts the longitudinal mobility of the anchoring device 1 relative to the bracket 2 into the forward direction whereas the forward wall defined by the tangs 17 restricts the longitudinal mobility of the anchoring device 1 relative to the bracket 2 into the backward direction.

In order to dismount the anchoring device 1, the ring member 11 may be pressed backward into the sleeve element 9 towards the dismounting position shown in FIG. 4b. Thereby, the ring member 11 forces the tangs 17 to move concertedly radially inward such that the diameter of the forward wall of the circumferential groove 25 decreases. Once the ring member 11 has reached the dismounting position shown in FIG. 4b the diameter of the forward wall of the circumferential groove 25 is smaller than the inner diameter of the aperture 5 of the bracket 2 such that the anchoring device 1 may be released by a manual backward movement out of the bracket 2.

Due to the outer inclined tang surfaces 31 which are adapted to be able to be in sliding contact with a bracket 2 the ring member 11 does not have to be pushed into the sleeve member 9 for mounting the anchoring device 1 on the bracket 2. For mounting the anchoring device 1 on the bracket 2 it simply needs to be pushed forward into the aperture 5 of the bracket 2, because the bracket 2 is able to force the tangs radially inward during insertion of the anchoring device 1.

The exploded view of FIG. 5 illustrates that the anchoring device 1 further comprises three inner elements 45, 47, 49. One of the inner elements is a central inner part 45 which is a tube with a peripheral central flange 51 for centering the inner tube on the longitudinal axis z. The outer surface of the tube may be threaded at both ends. The other of the inner elements are a forward inner attachment sleeve 47 and a rear inner attachment sleeve 47 which are identically shaped and may comprise an inner thread to be the screwed on the forward and the rear end of the inner part 45, respectively. The inner attachment sleeves 47, 49 have a peripherally profiled flange 55 located at the end directed towards the inner part 45. The profiled flange 55 may act as a gripping wheel such that the distance between the inner attachment sleeves 47, 49 and the central flange 51 of the inner part 45 may be adjusted manually by rotation causing the inner attachment sleeves 47, 49 to screw in or out, i.e. to move longitudinally relative to the inner part 45. The inner attachment sleeves 47, 49 further have a profiled peripheral surface 57 and a tapering end portion 59. Once the desired longitudinal position of the attachment sleeves 47, 49 is adjusted, the tapering end portion 59 may be pushed into an end portion of a sheath of a Bowden-type cable such that the profiled peripheral surface 57 gets into a frictional contact with the inner peripheral surface of the sheath. An inner wire 61 of the Bowden-type cable may then extend along the z-axis through the inner part 45 and the complete anchoring device 1.

This means that the anchoring device 1 may also act as a connector device between two sheaths of a Bowden-type cable. An end of a first sheath may be attached to the forward attachment sleeve 47 and an end of a second sheath may be attached to the rear attachment sleeve 47. The Bowden-type cable with an inner wire 61 and two or more pieces of sheaths may therefore be anchored at the transitions between the sheath pieces. However, it is appreciated that one of the attachment sleeves 47, 49 may also remain unused, e.g. if the anchoring of the end of the Bowden-type cable is desired.

The sleeve element 9 is composed of a forward sleeve section 13 and a backward sleeve section 15. The inner surface of the sections 13, 15 is designed in such a way that the inner part 45 and the attachment sleeves 47, 49 are securely embedded inside the sleeve element 9 preventing a radial or longitudinal displacement of the inner part 45 and the attachment sleeves 47, 49 relative to the sleeve element 9. The forward sleeve section 13 comprises the walls of the circumferential groove and may be connected to the backward sleeve section by hooks 63 adapted to engage corresponding notches 65 in the backward sleeve section 15, as also shown in FIGS. 4a and 4b.

Figure 7:
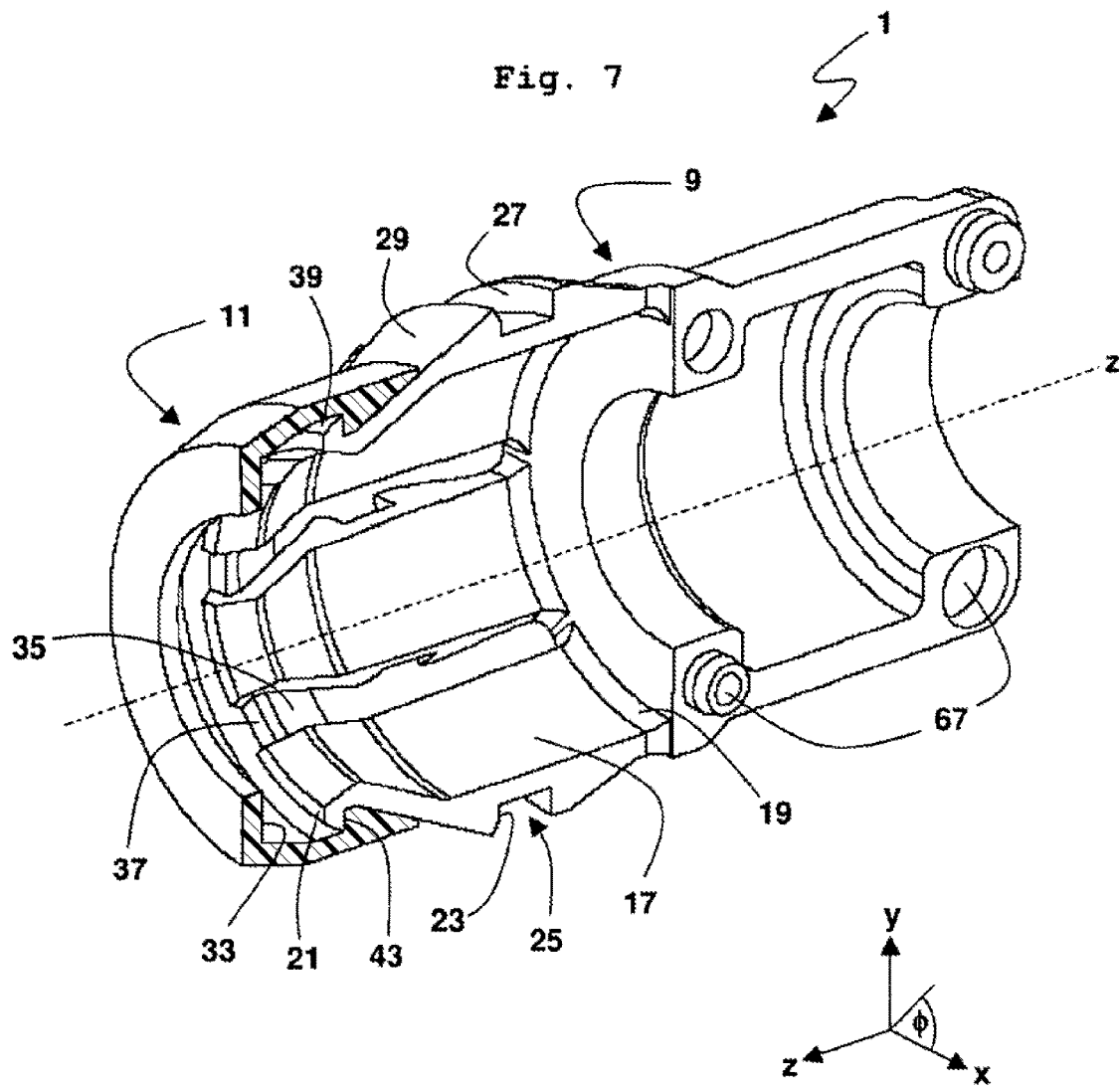
FIG. 7 shows a perspective view of one half of a second preferred embodiment of an inventive anchoring device.

FIGS. 6 and 7 show a second preferred embodiment of the inventive anchoring device 1. It is only one longitudinal half of the anchoring device 1 shown. The halves are identically shaped except for corresponding male/female connector parts 67 which are mutually inverted between the halves in order to provide a robust connection between them. It is appreciated that also the first embodiment of the anchoring device 1 can analogously be comprised of longitudinal halves which are connectable to each other.

In contrast to the first embodiment the second embodiment of the present invention has a sleeve element 9 with tangs 17 comprising inclined tang surfaces 29 which are arranged to be in sliding contact with the ring member 11 as well as adapted to be able to be in sliding contact with a bracket 2. This means that each tang 17 comprises only one inclined tang surface 29 instead of two separate inclined tang surfaces 29 and 31.

In the second embodiment, the fixed end 19 of the tangs 17 is located backward from the loose end 21. Therefore, the transversal tang surfaces 23 defining the backward wall of the groove 25 are not arranged directly at the loose end 21 of the tangs 17 where the tangs 17 have the highest radial mobility, but at an intermediate section of the tang 17. Therefore, the tangs 17 are longer and designed chunkier, because they need to perform a larger inward angular deflection compared to the tangs of the first embodiment. As a result, the tangs of the second embodiment are designed more robust against breaking.

In the second embodiment, the ring member 11 is not inserted into the forward inner opening of the sleeve element 9. Instead, the sleeve element 9 is inserted with its tangs 17 into the backward inner opening of the ring member 11. During this insertion the tangs 17 are forced to move radially inward and snap outward as soon as the sleeve element 9 is fully inserted.

In order to prevent a release of the ring member 11 off the sleeve element 9 the longitudinal movement of the ring member 11 relative to the sleeve element 9 is restricted. Otherwise the ring member 11 would be separable from the sleeve element 9 which would yield an increased risk of losing the ring member 11. To achieve such a restriction, the sleeve element 9 has an outward flange portion at the loose end 21 of each tang, wherein the outward flange portion defines transversal stop surfaces 43 which are adapted to restrict the longitudinal movement of the ring member 11 relative to the sleeve element 9. These transversal stop surfaces 43 act as hooks which hook the tangs 17 in an inner transversal abut surface 37 of the ring member 11 as soon as the tangs 17 have snapped radially outward. The ring member 11 is thereby secured against a forward release from the sleeve element 9 as the inner transversal abut surface 37 abuts against the transversal stop surfaces 43 at the loose end of the tangs 17.

However, the ring member 11 may be pushed from the mounting position shown in FIG. 7 manually backward relative to the sleeve element 9 towards a dismounting position. Upon such a relative backward movement the tangs 17 are forced radially inward such that the diameter of the forward wall of the circumferential groove 25 defined by the transversal tang surfaces 23 is decreased.

It is a also an advantageous feature of the second embodiment that an inclined ring member surface 35 is provided being in sliding contact with the inclined tang surfaces 29 is that the ring member 11 is biased by the resilient force of the tangs 17 towards the mounting position. Thereby, the ring member 11 is always prepared to be manually pushed backward into the dismounting position and the play of the ring is eliminated.

When the ring member 11 is in the mounting position, as shown in FIG. 7, an outer portion of the inclined tang surfaces 29 is not covered by the ring member 11. This portion is adapted to be in sliding contact with a bracket 2 such that the bracket 2 is able to force the tangs 17 radially inward upon a forward movement of the sleeve element 9 into an aperture 5 of a bracket 2. The tangs 17 snap back radially outward as soon as the bulkhead 3 of the bracket 2 reaches the backward wall 27 of the circumferential groove 25. A forward push movement of the ring element 11 into the dismounting position may then be applied in order to release the anchoring device 1 from the bracket 2.

The invention claimed is:

1. An anchoring device (1) for anchoring a sheath of a transmission cable to a bracket (2), wherein the device comprises:
   a sleeve element (9) having a longitudinal axis (z), wherein the sleeve element (9) is coaxially connectable to the sheath of the transmission cable,
   the sleeve element (9) having a plurality of resilient tangs (17) extending longitudinally and arranged in a circular configuration about the longitudinal axis (z),
   the tangs (17) each having a transversal tang surface (23), wherein the respective transversal tang surfaces (23) together define a wall of a circumferential groove (25),
   the circumferential groove (25) being able to receive the bracket (2) and secure the sheath of the transmission cable from longitudinal movement relative to the bracket (2), and
   a ring member (11) arranged coaxially and movable longitudinally relative to the sleeve element (9) between a first and a second longitudinal position, wherein the ring member (11) is biased toward the first longitudinal position by the resilient force of the tangs (17) and wherein the ring member (11) is able to force the tangs (17) to move concertedly radially inward upon movement of the ring member (11) from the first to the second longitudinal position such that a diameter of the wall of the circumferential groove (25) is decreased, and wherein at least a portion of the ring member (11) extends beyond an end of the sleeve element (9) along the longitudinal axis (z).

2. An anchoring device according to claim 1, wherein the tangs (17) each comprise a first inclined tang surface (29) having a normal vector with a radially outward component and tapering into a first longitudinal direction, wherein the first inclined tang surfaces (29) are arranged to be in sliding contact with the ring member (11) such that the ring member (11) is able to force the tangs (17) radially inward upon movement of the ring member (11) from the first to the second longitudinal position.

3. An anchoring device according to claim 2, wherein the ring member (11) comprises corresponding inclined ring member surfaces (35) having a normal vector with a radially inward component and being arranged to be in sliding contact with the first inclined tang surfaces (29) when the ring member (11) is in the first longitudinal position.

4. An anchoring device according to claim 2, wherein the tangs each further comprise a second inclined tang surface (31), the second inclined tang surfaces (31) adapted to be in sliding contact with the bracket and separate from the first inclined tang surfaces (29).

5. An anchoring device according to claim 2, wherein the first inclined tang surfaces (29) are also adapted to be in sliding contact with the bracket (2).

6. An anchoring device according to claim 1, wherein the tangs (17) comprise an inclined tang surface (29, 31) having a normal vector with a radially outward component and tapering into a longitudinal direction, wherein the inclined tang surfaces (29, 31) are adapted to be in sliding contact with the bracket (2) such that the bracket (2) is able to force the tangs (17) radially inward upon movement of the sleeve element (9) in the longitudinal direction.

7. An anchoring device according to claim 1, wherein the sleeve element (9) comprises two longitudinal halves connected to each other.

8. An anchoring device according to claim 1, wherein the sleeve element (9) has at least one transversal stop surface

(43) adapted to restrict the longitudinal movement of the ring member (11) relative to the sleeve element (9).

9. An anchoring device according to claim 8, wherein the at least one transversal stop surface (43) is a surface of at least one of the plurality of resilient tangs (17).

10. An anchoring device according to claim 9, wherein the ring member (11) has at least one transversal abut surface (37) adapted to abut against the at least one transversal stop surface (43) of the sleeve element (9).

11. A motion transmitting remote control assembly comprising a transmission cable having an inner cable arranged within a sheath, the assembly comprising:
   a bracket (2);
   an anchoring device (1), comprising:
      a sleeve element (9) having a longitudinal axis (z) and coaxially connectable to the sheath of the transmission cable,
      the sleeve element (9) having a plurality of resilient tangs (17) extending longitudinally and arranged in a circular configuration about the longitudinal axis (z),
      the tangs (17) each having a transversal tang surface (23) defining a wall of a circumferential groove (25),
      the circumferential groove (25) being able to receive the bracket (2) and secure the sheath of the transmission cable from longitudinal movement relative to the bracket (2), and
      a ring member (11) arranged coaxially and movable longitudinally relative to the sleeve element (9) between a first and a second longitudinal position, wherein the ring member (11) is biased toward the first longitudinal position by the resilient force of the tangs (17) and wherein the ring member (11) is able to force the tangs (17) to move concertedly radially inward upon movement of the ring member (11) from the first to the second longitudinal position such that a diameter of the wall of the circumferential groove (25) is decreased, wherein at least a portion of the ring member (11) extends beyond an end of the sleeve element (9) along the longitudinal axis (z); and
   wherein the sheath of the transmission cable is anchored to the bracket (2) via the anchoring device (1).

12. A motion transmitting remote control assembly according to claim 11, wherein the bracket (2) comprises a transversal bulkhead (3) defining an aperture (5), wherein the tangs (17) of the anchoring device (1) at least partially protrude through the aperture (5).

13. A motion transmitting remote control assembly according to claim 12, wherein the circumferential groove (25) of the anchoring device (1) is engaged by the bulkhead (3) and secures the sheath of the transmission cable from longitudinal movement relative to the bracket (2).

14. A motion transmitting remote control assembly according to claim 12, wherein the aperture (5) is fully surrounded by a material of the bulkhead (3) or with one side open to a slot (7).

15. An anchoring device (1) for anchoring a sheath of a transmission cable to a bracket (2), wherein the device comprises:
   a sleeve element (9) having a longitudinal axis (z), wherein the sleeve element (9) is coaxially connectable to the sheath of the transmission cable,
   the sleeve element (9) having a plurality of resilient tangs (17) extending longitudinally and arranged in a circular configuration about the longitudinal axis (z),
   the tangs (17) each having a transversal tang surface (23), wherein the respective transversal tang surfaces (23) together define a wall of a circumferential groove (25),
   the circumferential groove (25) being able to receive the bracket (2) and secure the sheath of the transmission cable from longitudinal movement relative to the bracket (2),
   a ring member (11) arranged coaxially and movable longitudinally relative to the sleeve element (9) between a first and a second longitudinal position, wherein the ring member (11) is able to force the tangs (17) to move concertedly radially inward upon movement of the ring member (11) from the first to the second longitudinal position such that a diameter of the wall of the circumferential groove (25) is decreased, and wherein at least a portion of the ring member (11) extends beyond an end of the sleeve element (9) along the longitudinal axis (z), and
   the tangs (17) each comprise a first inclined tang surface (29) having a normal vector with a radially outward component and tapering in a first longitudinal direction, wherein the first inclined tang surfaces (29) are arranged to be in sliding contact with the ring member (11) such that the ring member is able to force the tangs radially inward upon movement of the ring member (11) from the first to the second longitudinal position and the first inclined tang surfaces (29) are also adapted to be in sliding contact with the bracket (2).

16. An anchoring device (1) according to claim 15, wherein the sleeve element comprises two longitudinal halves connected to each other.

17. An anchoring device (1) according to claim 15, wherein the sleeve element (9) has at least one transversal stop surface (43) adapted to restrict the longitudinal movement of the ring member (11) relative to the sleeve element (9).

18. An anchoring device (1) according to claim 17, wherein the at least one transversal stop surface (43) is a surface of at least one of the plurality of resilient tangs (17).

19. An anchoring device (1) according to claim 15, wherein the ring member (11) has at least one transversal abut surface (37) adapted to abut against the at least one transversal stop surface (43) of the sleeve element (9).

* * * * *